J. R. RUSSELL.
NON-REFILLABLE BOTTLE.
APPLICATION FILED MAY 16, 1917.
1,249,834.
Patented Dec. 11, 1917.
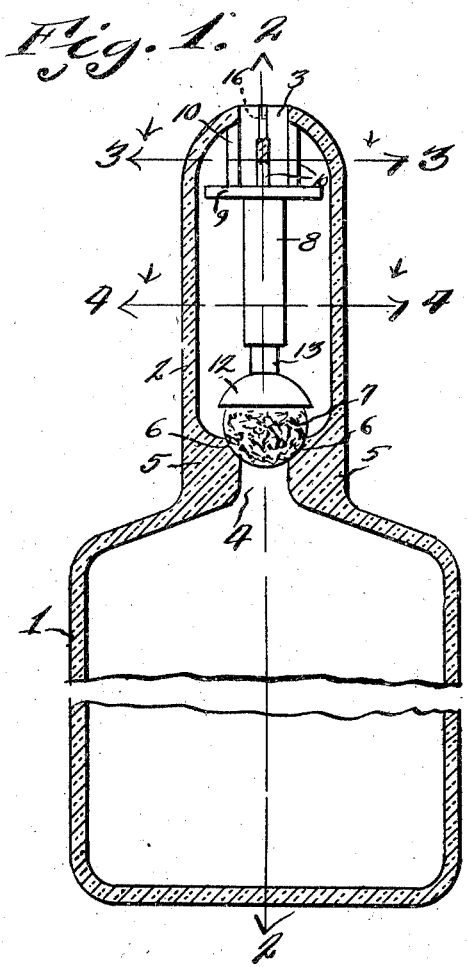
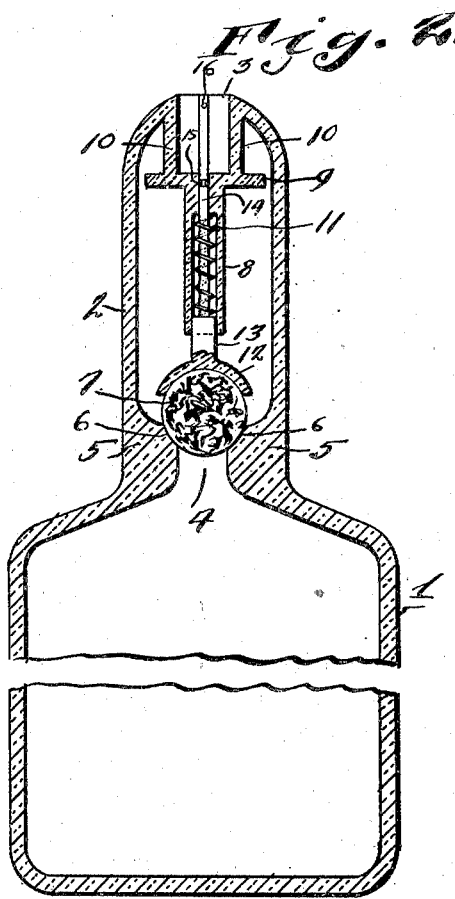
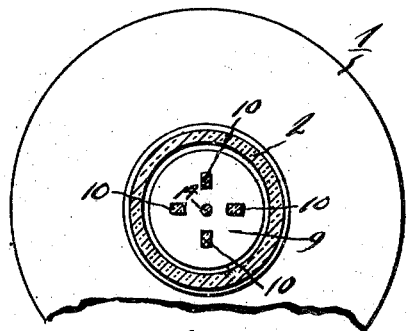
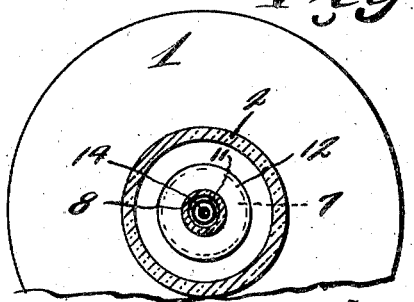
Witnesses
Inventor
J. R. Russell

UNITED STATES PATENT OFFICE.

JOHN RITCHARD RUSSELL, OF COALGATE, OKLAHOMA.

NON-REFILLABLE BOTTLE.

1,249,834.  Specification of Letters Patent.  Patented Dec. 11, 1917.

Application filed May 16, 1917. Serial No. 169,053.

*To all whom it may concern:*

Be it known that I, JOHN RITCHARD RUSSELL, a citizen of the United States, residing at Coalgate, in the county of Coal, State of Oklahoma, have invented a new and useful Non-Refillable Bottle; and I do hereby declare the following to be a full, clear, and exact description of the invention, such as will enable others skilled in the art to which it appertains to make and use the same.

The invention relates to a device which, when applied to a bottle or vessel renders the same non-refillable.

One of the objects is to provide means for effectively closing the mouth of the vessel to which the device is attached.

A further object is to make the closing means yieldable to the contents of the vessel when the latter is inverted, so that the contents may be easily emptied therefrom.

A still further object is to provide a means connected with the closing means that will permit the closing means to be opened to permit the vessel to be filled.

A still further object aims to make this opening means removable by breaking, so that the vessel is secured against refilling.

Other objects will appear from the detailed description which follows.

The drawings show the present invention applied to the bottle but it may be attached to any other vessel where such a device is of value. A specific structure is also adhered to in illustrating the device itself but the invention is not to be confined to this specific structure. The right is reserved to make such changes or alterations as practice may demand, provided such changes or alterations are comprehended in spirit by the appended claim.

Should the drawings illustrate some structure that is not defined in the specification or vice versa, the right to such structure is claimed as though it had been fully treated by both.

The same numerals of reference designate the same parts throughout the several figures of the drawings, wherein:

Figure 1 is an elevation of the invention positioned in the neck of a bottle, the bottle itself being shown in section.

Fig. 2 is a section on the line 2—2 of Fig. 1.

Fig. 3 is a section on the line 3—3 of Fig. 1.

Fig. 4 is a section on the line 4—4 of Fig. 1.

In the drawings, 1 represents the body of an ordinary glass bottle having the neck 2. The neck is rounded at the upper end and has an opening 3 in the center thereof. The main portion of the neck is hollow, this hollow portion being of considerably greater diameter than the opening 3. An opening 4, of substantially the same diameter as the opening 3 provides communication from the neck 2 and body 1 of the bottle. The ledge 5 in the neck 2 has a seat 6 formed on its upper edge on which a ball valve 7 (made preferably of cork) is adapted to be seated.

Within the neck 2 and made integral therewith, the arms 10 depend from the opening 3. These arms are integrally connected with the flange 9 which is also integrally connected with the tubular member 8.

A hole extends centrally through the tubular member 8 and flange 9, this hole being enlarged for the greater portion of its length to provide a compartment for the spiral spring 11 (made preferably of bronze).

The concave cap 12, having an inner surface generated to the radius of the ball 7, is designed to rest upon the ball 7 and keep it upon the seat 6, thus closing the opening 4. An integral hub 13 emanates from the center of the cap 12 and enters the enlarged portion of the hole in the tubular member 8 where the spring 11 presses upon it. An integral stem 14 protrudes from the hub 13 and rises centrally through the spring 11, terminating flush with the top of the opening 3. This stem 14 has a contracted portion 15 just above the flange 9 and an eye 16 just below the opening 3.

The spring 11 is designed to have a pressure to keep the ball 7 seated only when the inverted bottle is empty. When it is desired to fill the bottle, a hook is inserted in the eye 16 of the stem 14 and the stem 14 and cap 12 are raised thereby when the bottle 1 may be filled by immersion or by pouring through the opening 3. The filling is permitted by the raising of the cap 12 because it no longer rests upon the ball 7 which, being of cork, is floated from the seat 6 by the inflowing liquid.

After the bottle 1 has been filled the stem 14 is broken off at its contracted portion 15 and further raising of the cap 12 is thereby precluded.

The spring 11 being only of sufficient strength to keep the ball 7 seated when the bottle is empty, the contents of the bottle may be easily emptied by inverting the latter, when the weight of the contents will operate to unseat the ball 7 against the pressure of the spring 11 and the contents will be permitted to flow out of the bottle through the openings 4 and 3.

Having been once filled and emptied, the bottle is secured against refilling, because of the absence of the upper part of the stem 14 containing the eye 16, this missing portion of the stem preventing any further raising of the cap 12 to permit the unseating of the ball 7.

What is claimed is:

A vessel having a hollow neck, its upper exterior end surface being semi-spherical and provided with an opening, arms integral with the inner surface of said end adjacent the marginal edge of said opening, a disk plate integral with the lower ends of said arms and provided with a downwardly extending restricted tubular extension, the upper end of which having a restricted opening, the bottom of said neck having a restricted opening provided with a valve seat, a cork ball valve engaging said seat to close its opening, a substantially semi-spherical plate engaging on said valve, and provided with an extension extending upwardly and guided in the lower end of the restricted extension, said extension of the spherical plate having a stem passing through the tubular extension and through said restricted opening, a spring interposed between the upper end wall of said tubular extension and the extension of the spherical plate to hold said plate in contact with the valve, the upper end of the stem adjacent the upper face of the plate of said depending arms having a contracted frangible neck, whereby the upper extreme end portion of the stem may be broken off when the vessel is filled, thereby preventing manual raising of said stem.

In testimony whereof I have signed my name to this specification in the presence of two subscribing witnesses.

JOHN RITCHARD RUSSELL.

Witnesses:
B. C. MAXWELL,
R. E. DOSS.

Copies of this patent may be obtained for five cents each, by addressing the "Commissioner of Patents, Washington, D. C."